(12) United States Patent
Lewis et al.

(10) Patent No.: US 9,421,565 B2
(45) Date of Patent: Aug. 23, 2016

(54) SYSTEMS AND METHODS FOR PROCESSING AND DISPENSING FILLED MULTI-COMPONENT MATERIALS

(75) Inventors: Russell Lewis, Las Vegas, NV (US); Mihai Solomon, San Diego, CA (US)

(73) Assignee: Rhino Linings Corporation, San Diego, CA (US)

( * ) Notice: Subject to any disclaimer, the term of this patent is extended or adjusted under 35 U.S.C. 154(b) by 106 days.

(21) Appl. No.: 14/234,115

(22) PCT Filed: Jul. 21, 2011

(86) PCT No.: PCT/US2011/044894
§ 371 (c)(1),
(2), (4) Date: Mar. 24, 2014

(87) PCT Pub. No.: WO2013/012427
PCT Pub. Date: Jan. 24, 2013

(65) Prior Publication Data
US 2014/0193630 A1    Jul. 10, 2014

(51) Int. Cl.
*B67D 7/70*    (2010.01)
*B05B 11/00*    (2006.01)
(Continued)

(52) U.S. Cl.
CPC ........... *B05B 11/3084* (2013.01); *B01F 5/0496* (2013.01); *B05C 17/00553* (2013.01);
(Continued)

(58) Field of Classification Search
CPC ........ B01F 5/0496; B01F 5/0607; B01F 7/00; B01F 13/00; B05B 11/3084; B05C 17/00553; B05C 17/00556; C08L 75/04; C08L 21/00; C08L 75/02; C08G 18/3203; C08G 18/3225; C08G 18/3271

USPC ............. 222/135, 145.1, 145.5, 145.6, 145.7, 222/71, 146.2
See application file for complete search history.

(56) References Cited

U.S. PATENT DOCUMENTS 3,216,622 A * 11/1965 Drostholm .............. G01F 13/00
222/135
3,236,416 A * 2/1966 Fritz ..................... B29B 7/7476
222/135

(Continued)

FOREIGN PATENT DOCUMENTS

DE    411216    3/1925
EP    0529839 A1    3/1993

OTHER PUBLICATIONS

International Search Report for PCT/US2011/44894, Dec. 8, 2011 total 1 page.

(Continued)

*Primary Examiner* — J. Casimer Jacyna
*Assistant Examiner* — Benjamin R Shaw
(74) *Attorney, Agent, or Firm* — Snell & Wilmer L.L.P.

(57) ABSTRACT

Multi-component materials are substantially homogeneous and fully curable and comprise an elastic filler, an isocyanate curing agent, and a polyol resin ingredient that when combined produce a polymeric matrix, polyurethane and/or polyurea, having the filler dispersed therein. The material has a variation in polyisocyanate weight ratio of up to 350%. The filler is ground rubber tire particles sized 20 mesh or smaller. The mix weight ratio of the curing agent to resin ingredient is from about 40:100 to 140:100. The material is made and dispensed using a system configured to combine a heated mixture of the resin and filler with the curing agent at a desired variable mix ratio. A controller is used to provide the desired mix ratio and permits "on the fly" adjustment of the mix ratio while the resin and curing agent is being dispensed.

17 Claims, 2 Drawing Sheets (51) Int. Cl.
    *B05C 17/005*   (2006.01)
    *C08G 18/32*    (2006.01)
    *B01F 5/04*     (2006.01)
    *C08L 21/00*    (2006.01)
    *C08L 75/02*    (2006.01)
    *C08L 75/04*    (2006.01)

(52) U.S. Cl.
    CPC ...... *B05C17/00556* (2013.01); *C08G 18/3203* (2013.01); *C08G 18/3225* (2013.01); *C08G 18/3271* (2013.01); *C08L 21/00* (2013.01); *C08L 75/02* (2013.01); *C08L 75/04* (2013.01)

(56) References Cited

U.S. PATENT DOCUMENTS

| | | | |
|---|---|---|---|
| 3,635,851 A | | 1/1972 | Hoeschele |
| 4,019,652 A * | | 4/1977 | Suh ............... B29B 7/7615 222/1 |
| 4,154,368 A * | | 5/1979 | Gusmer ............ B05B 7/0018 222/135 |
| 4,279,360 A * | | 7/1981 | Hauser ............ B29C 31/06 222/1 |
| 4,341,327 A * | | 7/1982 | Zeitz ............... B67D 7/08 222/135 |
| 4,705,814 A | | 11/1987 | Grigsby et al. |
| 4,732,919 A | | 3/1988 | Grigsby et al. |
| 4,938,381 A * | | 7/1990 | Mandeville ......... B29B 7/002 222/1 |
| 4,975,514 A | | 12/1990 | Watanabe et al. |
| 5,013,813 A | | 5/1991 | Zimmerman et al. |
| 5,531,357 A * | | 7/1996 | Guilmette ............ G01M 3/283 138/103 |
| 5,668,189 A | | 9/1997 | Farkas |
| 5,799,833 A * | | 9/1998 | Green ............... B67D 7/78 222/135 |
| 5,857,589 A * | | 1/1999 | Cline ............... B01F 5/0615 222/1 |
| 5,948,367 A * | | 9/1999 | Gmeiner ............ B01F 15/0475 222/133 |
| 7,036,686 B2 * | | 5/2006 | Newton ............ B67D 1/0029 137/111 |
| 7,661,352 B2 * | | 2/2010 | Sher ............... B67D 1/0021 222/129.1 |
| 8,424,725 B2 * | | 4/2013 | Boyer .............. B67D 1/0036 222/1 |
| 2007/0000947 A1 * | | 1/2007 | Lewis ............... B01F 15/042 222/132 |
| 2007/0066786 A1 | | 3/2007 | Hanson et al. |
| 2011/0259919 A1 * | | 10/2011 | Choiniere ............ B05B 9/007 222/135 |
| 2014/0231010 A1 * | | 8/2014 | Park .............. H01L 21/67075 156/345.11 |
| 2014/0305969 A1 * | | 10/2014 | Dittrich ............ B67D 3/0019 222/135 |

OTHER PUBLICATIONS

European Search Report for EP0529839, Nov. 9, 1992 total 1 page.
International Preliminary Report on Patentability and Written Opinion for PCT/US2011/44894, issued Jan. 21, 2014, 7 pages.

* cited by examiner

SYSTEMS AND METHODS FOR PROCESSING AND DISPENSING FILLED MULTI-COMPONENT MATERIALS

CROSS-REFERENCE TO RELATED APPLICATIONS

The present application is a U.S. National Stage entry under 35 U.S.C. §371 of International Application No. PCT/US2011/044894, filed on 21 Jul. 2011, which is hereby incorporated by reference in its entirety.

FIELD OF THE INVENTION

This invention relates generally to multi-component materials such as those useful in coating applications and the like, and more specifically, to a method and system/apparatus for processing and delivering fluidic viscous multi-component materials in a manner that permits the mix ratio of precursor materials to be changed during such processing and delivery.

BACKGROUND OF THE INVENTION

Conventional multi-component materials comprise a polymeric matrix that may contain filler materials used to contribute volume and/or desirable physical and/or chemical characteristics to the resulting finally-cured product. Such multi-component materials are used for many purposes, including coatings for an object or surface, to treat or protect the underlying object or surface, and/or to impart desired appearance, texture or other properties to the underlying object or surface. Polymeric matrix materials used in such conventional multi-component materials can comprise a variety of polymers, including polyurethanes and polyureas.

Such multi-component materials are known to include fillers that do not adhere well to the polymeric material matrix, e.g., when the matrix is a polyurethane or polyurea matrix. Also, many fillers can decrease desired properties like elasticity, fatigue resistance, and impact strength in the finally-cured product that can make the finally-cured product poorly suited to a number of desired end-use applications. Further, some fillers can also be relatively expensive, thereby increasing costs. Still further, some fillers may be toxic or harmful the environment when manufacturing the filler or disposing of the filler, thereby presenting undesired safety, health, and/or environmental issues.

Conventional systems for processing, handling, mixing and applying the components of a multi-component material are designed to handle low viscosity resins and hardeners, with low level of solid fillers incorporated in the resin. Fillers that contain larger particulate components, or mixtures of fillers having very different mixing properties, are generally incompatible with these conventional systems.

Additionally, conventional systems used for making multi-component materials meter the reactive precursor components using multiple independent pumps, wherein each pump has its own individual controllers and flow sensors to properly combine and mix the polymer matrix components. The added complexity is costly and makes the equipment less reliable in terms of variations in metering (less precision) as well as equipment failure. In addition, it is desired to have a precise and reliable metering system to meter the components of the multi-component material before mixing, so that, during mixing, specific, predetermined proportions of the components (the mix ratios) are closely maintained.

While such systems may be engineered to enable adjusting the mix ratio of precursor materials for dispensement to meet a particular end-use application, e.g., for a particular dispensement or delivery event, such systems are not capable of enabling one to adjust the mix ratio of precursor reactive components "on the fly" or during a particular dispensement or delivery event. Adjusting the mix ratio of the precursor reactive components during the actual process of dispensing or delivery is highly desirable for particular end-use applications. An example of such an end-use application includes almost all industrial floor coatings, were there is a need to create high abrasion resistance, hardness (e.g., for heavy equipment such as forklifts and the like), while at the same time the coating over the expansion joints needs to have high elongation (because of the continuous movement of the joints).

Additionally, conventional multi-component materials are somewhat limited in the combinations of physical properties that can be provided, which limitation is due to the slight variation in isocyanate mix ratio that is maintained for the purpose of providing a fully-cured product. Such conventional multi-component materials are known to have a variation in isocyanate mix ratio of about +/−5%. For certain end-use applications, it would be desirable to be able to provide a multi-component material having a greater variation of isocyanate mix ratio, while still maintaining the ability to provide a fully-curable product, for the purpose of providing an end product having a greater diversity and/or different combinations of physical characteristics, such as hardness, tensile strength, and elongation.

Such conventional systems typically use piston pumps for solid filled liquid resin material. However, piston pumps can provide non-uniform flow (i.e. a variation from a nominal, set, flow rate) due to the piston pump changing direction at the end of each stroke. Non-uniformity can produce mixing ratio variations that produce a non-uniform multi-component product, where polymerization is incomplete, and is particularly problematic for some filled materials because it can produce localized regions of inferior product. For example, when applied as a relatively thin layer (e.g., less than about 1 cm in thickness, or less than about 5 mm in thickness), localized regions of high or low filler concentration can produce spots where the solidified material is weakened by having too much filler, or excessively stiff or brittle where too little filler is present. Maintaining a relatively homogeneous distribution of filler is thus especially important for embodiments described herein where the material is used to form a thin layer on a surface.

Some known multi-component materials comprise compositions of resin, curing agent, and finely divided particulate filler that are suitable for spray application. Application by spraying further complicates selection of filler materials and preparation of the resin and/or curing agent component. The reactive component containing a filler must be prepared as a suspension for spraying, and the filler must be sized suitably for spray application. The filler must be kept in a homogeneous suspension in one of the reactive components, typically the resin, while feeding it into a spraying device and mixing it in proper mix ratio with the other component (usually the curing agent), in preparation for spraying. It must then be formed into an aerosol with droplet size suitable for spraying onto a surface to be coated before polymerization occurs to an extent that interferes with spraying onto a surface. While spray-on materials such as polyurethane and polyurea materials that polymerize rapidly upon application are well known in the art, such materials having particulate fillers as described herein have not been available due to the complexity of forming a suitable homogeneous mixture for aerosol application to produce a uniform product.

It is, therefore, desirable that multi-component materials be developed comprising a filler material that introduces desired properties into the finally-cured product, and does so in a manner that does not detract from such properties as elasticity, fatigue resistance, and impact strength, that does not introduced unwanted safety, health or environmental issues, and that does not detrimentally increase product costs, or that decrease product costs. Additionally, it is desired that a system/apparatus be developed that is capable of mixing greater levels of and diverse types of fillers (including large particle fillers), and incorporating the filler into the precursor materials to provide a delivery product having the filler uniformly dispersed within the polymer matrix.

It is further desired that such system/apparatus be engineered to enable combining the precursor materials at precise mixing amounts and at different and greater variations of mix ratios while such combined precursor materials are being dispensed to provide fully-cured products well suited for end-use applications, thereby providing "on the fly" adjustability of the precursor mix ratio. It is still further desired that such system/apparatus be engineered in a manner that produces a uniform flow of precursor reactive materials, thereby producing a dispensed product having a uniform distribution of the multi-component material.

Finally, it is desired that the system/apparatus be engineered in a manner that produces a homogeneous mixture of reactive precursor components and particulate fillers suitable for aerosol application to produce a uniform product. Such compositions, systems/apparatus and methods will allow for the preparation of highly filled, viscous reactive components (resins and/or curing agents) for making filled multi-component materials, with precise metering to produce a consistent and homogeneous sprayed-on product, at variable mix ratios "on the fly" in a reliable manner, without the need for complex mechanisms.

SUMMARY OF THE INVENTION

Multi-component materials as disclosed herein comprise substantially homogeneous fully curable materials that are prepared by combining: (a) a filler comprising an elastomeric material; with (b) first reactive component that is at least one polyisocyanate monomer; (c) and a second reactive component selected from the group consisting of at least one polyalcohol monomer, at least one polyamine monomer, and combinations thereof, that are capable of forming a polyurea, polyurethane or copolymer of polyurethane and polyurea by reacting with the polyisocyanate monomer. The resulting substantially homogeneous fully curable multi-component material has a variation in polyisocyanate weight ratio of up to about 350%.

In an example embodiment, the first and second reactive components undergo polymerization to form a polymeric matrix, and the elastic filler is dispersed within the polymer matrix. In a preferred embodiment, the polymeric matrix comprises polyurethane or polyurea, and the elastic filler comprises ground rubber tire particles.

Such multi-component materials having a mix weight ratio of the first reactive component to the second reactive component from about 40:100 to 140:100. If desired, the multi-component material may include a filler formed from a hard material, in which case the combined fillers may comprises from about 20% to 70% by weight of the total weight of the material. In such an embodiment, where the filler includes a hard material, the mix ratio of the first reactive component to the second reactive component is from about 20:100 to 70:100.

In an example embodiment, the elastomeric filler comprises 5 to 70% ground rubber tire filler having a particle size of about 20 mesh or smaller. If desired, the multi-component material can be prepared by additionally using catalyst to promote polymer forming reaction of the first and second reactive components. The multi-component material may further comprise a blowing agent or entrained air to promote formation of a foamed product if such is desired.

The multi-component material is fully curable into a solid, which is produced by spraying the mixture onto a desired surface under conditions where polymerization occurs. In an example embodiment, the multi-component material forms a substantially solid layer that may have an average thickness of about 0.5 mm and 10 mm.

Multi-component materials as disclosed herein are prepared by a process comprising the steps of: (a) providing a first reactive component comprising a resin ingredient and a plurality of filler particles, wherein the filler particles comprise recycled ground rubber tire; (b) providing a second reactive component comprising a curing agent capable of curing the resin ingredient to form a polymeric matrix; (c) mixing the first reactive component and the filler in a first reservoir to provide a substantially homogeneous mixture; (d) metering the first reactive component and the second reactive component using respective first and second pumping mechanisms to achieve a predetermined mix ratio of the first reactive component and the second reactive component, wherein during the step of metering, operating the first and second pumping mechanisms to provide a variation of curing agent mix ratio of up to about 350%; (e) mixing the first reactive component and the second reactive component to form a polymerization mixture; and (f) dispensing the polymerization mixture onto a surface to provide a fully-curable multi-component material.

In an example embodiment, the first reservoir is heated and includes a mixing device. The first reactive component may be delivered to the first pumping mechanism via a heated supply line. In such process the first and second pumping mechanisms are driven by different motors having a controlled speed to provide the desired variation in mix ratio. Additionally, the mix weight ratio of the first and second reactive components may be adjusted during the step of dispensing to permit "on the fly" variation in the mix ratio as desired to meet certain end-use applications.

In an example process, the pumping mechanisms can be adjusted, e.g., by adjusting the speed of the drive motors, to provide a desired volumetric output of the multi-component material, and such adjusting may take place after the step of metering to achieve the desired mix ratio.

The multi-component material is prepared and dispensing using a system and/or apparatus that is configured to deliver the fully-curable multi-component material. Such system comprising a dispensing apparatus having first and second inlet ports, an outlet port, and a mixing chamber in fluid communication with each of the first and second inlet ports and the outlet port. The system includes a mixing element that is at least partially disposed in the mixing chamber and that is configured to mix a first reactive component comprising a resin ingredient and an elastic filler with a second reactive component comprising a curing agent. In a preferred example, the mixing element is a disposable static mixer.

The system includes a first reservoir that is configured to store the first reactive component and elastic filler, wherein the first reservoir has a heating element configured to heat the first component and filler to a predetermined temperature while the first component and filler is stored therein. The first reservoir includes a mixer configured to mix the first reactive component and filler while the first reactive component and filler is stored in the first reservoir. The system includes a second reservoir configured to store the second reactive component.

The system includes a first pumping mechanism that is adapted to pump and meter the first reactive component and filler from the first reservoir to the first port of the dispensing apparatus. In a preferred embodiment, the first pumping mechanism and the first reservoir are physically connected by a heated transfer line. A second pumping mechanism is adapted to pump and meter the second reactive component from the second reservoir to the second port of the dispensing apparatus.

The system includes a controller configured to regulate the output of the first and second pumping mechanisms to provide a variation of curing agent mix ratio of up to about 350%. In an example embodiment, the controller is configured to provide the variation of curing agent mix ratio while the multi-component material is being dispensed by the dispensing apparatus, i.e., on the fly. In an example embodiment, the system comprises two motors that are connected to drive respective first and second pumping mechanism, and the controller regulates the speed of the two motors to provide speed ratio control.

Multi-component materials, method and systems/apparatus useful for making and dispensing the same provide desired combinations of product physical characteristics such as elasticity, elongation, fatigue resistance, and impact strength, that meets desired end-use applications and that does so in a manner that does not introduced unwanted safety, health or environmental issues, and that does not detrimentally increase product costs, or that decrease product costs.

Such materials, methods and systems enable producing a product having a greater level of and diverse types of fillers (including large particle fillers), and facilitate incorporating the filler into the precursor materials to provide a delivery product having the filler uniformly dispersed within the polymer matrix. Further, such materials, methods and systems enable combining reactive components at precise mixing amounts and at different and greater variations of mix ratios while such combined reactive components are being dispensed to provide fully-cured products well suited for end-use applications, thereby providing "on the fly" adjustability of the precursor mix ratio.

Such materials, methods and systems enable formation of products comprising homogeneous mixture of reactive precursor components and particulate fillers suitable for aerosol application to produce a uniform product. This feature allows for the preparation of highly-filled, viscous reactive components (resins and/or curing agents) for making filled multi-component materials, with precise metering to produce a consistent and homogeneous sprayed-on product, at variable mix ratios "on the fly" in a reliable manner, without the need for complex mechanisms.

BRIEF DESCRIPTION OF THE DRAWINGS

The following drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION

In the following description of example embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the invention as disclosed herein.

As used herein, the term "pump" when used as a noun refers to any motive source capable of physically moving a material such as, without limitation, a fluid or viscous material.

As used herein, the term "reactive mixture" refers to any multi-component reactive mixture where each individual component (e.g., first and second reactive components), when mixed, result in a chemical reaction whereby the substantially liquid individual components harden into a substantially solid state after a relatively brief period of time. Typically, the reaction proceeds sufficiently for the material to retain its shape within seconds (e.g., can be as low as 25 seconds) or minutes after mixing or after exposure to air, and at that point it behaves as a solid rather than a liquid, though it may not be fully cured or hardened so quickly. Examples of reactive components used to form a mixture include, without limitation, isocyanate and polyol, which when combined form a mixture that reacts into a substantially solid polyurethane coating.

As used herein, the term "dispensing" refers to any sort of release or provision of one or more materials to a desired location. Dispensing may comprise, without limitation and for example only, spraying (atomized or airless), pouring, and spattering-coating.

As used herein, "substantially homogeneous" means the mixture comprises a solution or polymeric matrix that is thoroughly mixed. Where filler or particulates are present, they are randomly distributed and are mixed throughout the sample, and the particulate materials have not settled out of solution or floated to its surface. While there may be small variations and gradients in the composition from point to point in the mixture, especially where particles are suspended in a solution or polymeric matrix, the composition of samples from the 'top' and 'bottom' of the mixture differ from the average overall composition by no more than about 50% with respect to amount of particulate per mL of material, for example; similarly, the composition of the liquid phase of the mixture differs by no more about 50% from the average overall composition.

"Elastic filler" as used herein refers to a material that is particulate in form but is not 'hard' like a granular powder or crystalline material. Elastic filler materials are capable of deforming, e.g., being compressed, by at least 10% under stress without breaking down. Examples of elastic filler materials could include soft plastics (e.g., polyethylene, polypropylene, polystyrene, etc.), rubber (synthetic or natural), sawdust or other finely divided plant materials, and the like.

Multi-component materials, and systems/apparatus and methods for mixing, metering and dispensing fluid and/or viscous materials, are disclosed herein. Such materials are formed and dispensed having a high degree of uniformity and consistency. Such multi-component materials can be provided comprising an environmentally friendly filler formed from recycled material, such as ground rubber tire and the like, wherein such imparts desirable characteristics to the material including low cost and surface rugosity, while providing a strong and durable finished surface.

Multi-component materials as disclosed herein provide a reactive component composition comprising an elastic filler, typically a recycled material such as ground rubber tires, as a filler. In an example embodiment, the reactive component is a resin suitable for forming a polyurethane, polyurea or copolymer of the two (i.e., a copolymer of polyurethane and polyurea). The composition can further comprise a curing agent present in a suitable mix ratio with the resin. In certain embodiments, this composition is mixed to provide a high degree of homogeneity of the reactive components and to keep the fillers suspended, so it is suitable for forming a homogeneous solidified product. In certain embodiments, the composition is formed by mixing the resin component and the curing agent under conditions to promote quick but not instantaneous polymerization. In certain embodiments, the composition is formed by mixing the resin and curing agent components and is then quickly dispersed into an aerosol while still in liquid form, i.e. before polymerization proceeds; this aerosol is suitable for spraying onto a surface and quickly polymerizes to form a multi-component material having filler(s) dispersed in a polymeric matrix. Optionally, the aerosol can include blowing agents and/or entrained air, as well as optional surfactants, to promote formation of a foamed polymerization product.

In an example embodiment, multi-component materials disclosed herein comprise a combination of hard fillers and elastic fillers. This can create a good balance between increased hardness plus tensile strength, and increased elasticity capabilities of the material. Such combination can also improve the adherence of the filler to the polymeric matrix to promote strength and resist damage. The hard fillers are typically relatively uniform in size, i.e., they have a relatively narrow size distribution. The small particle size distribution of the hard fillers can also improve the flow ability of the medium sized elastic filler particles. The elastic fillers are generally far more difficult to prepare with highly uniform size and properties, but if properly chosen and incorporated can be very useful for providing a surface that has high impact resistance but also has enough 'give' and surface texture to provide a high-friction surface.

Further volume, give or cushioning, and thermal insulation, as well as reduced weight, can be provided by forming the material as a foam. Methods for producing a foam by forming small bubbles in the material during mixing or aerosol formation, or during application or curing are known in the art and are discussed herein.

In an example embodiment, recycled rubber material (e.g. from recycled tires) can be used as elastic filler for multi-component materials. The use of recycled materials can be environmentally friendly, particularly where the material is not very biodegradable and would persist for many years in a landfill. In addition, the use of recycled rubber can significantly reduce formulation costs, as it can be less expensive than other similar types of filler that could be used, and also less expensive than the materials forming the polymeric matrix.

An example embodiment multi-component material comprises a combination comprising ground rubber tire material as a filler component, typically having a medium particle size distribution, in combination with a resin plus curing agent system that provides a short gel time polymeric matrix. Such a multi-component material, for example applied by means of atomization or airless spray, may have several advantages.

First, the material's external surface can have a high rugosity (variations or amplitude in the height of surface irregularities) when compared with non-filled material. This external surface rugosity can be created by the presence and dispersion of the medium sized rubber filler particles. This characteristic can provide a high friction coefficient of the rubber filled multi-component material. It also provides a very cost-effective increase in volume while retaining the desired toughness and other properties of the polymeric matrix when used in appropriate proportion.

In an example embodiment, a multi-component material comprising a recycled ground rubber tire filler is prepared. Optionally, the material also comprises a hard filler material. The process of preparing the material includes providing a first reactive component comprising a resin ingredient and at least one filler material, such as a recycled ground rubber tire filler, and providing a second reactive component comprising a curing agent capable of curing the resin to form a polymeric matrix. The first reactive component can be heated and mixed in a first reservoir so that the first component is substantially homogeneous. Maintaining homogeneity in this material is complicated by the presence of the insoluble filler material, but is needed to provide a high-quality, long-lasting multi-component material product.

In some embodiments, the filled multi-component material is formed into a layer that is substantially bubble-free, i.e., it is formed as a solid material rather than a foam. Methods for forming the polymeric matrices described herein without a filler material into substantially bubble-free layers (non-foamed materials) are well known in the art, and can be applied with the filled materials: the filler materials generally do not promote bubble formation or foaming when used as described herein. However, methods for producing foamed materials from the polyurethanes and other polymers described herein that can be used as the polymeric matrix for the filled materials are also known in the art, and can be combined with the filler materials described herein to further customize the properties of the filled multi-component materials. Thus each of the embodiments described herein can, unless otherwise indicated, be used with a suitable blowing agent and the like to form a foamed product, or it can be used to form a substantially solid product.

In an example embodiment, a substantially homogeneous multi-component formulation or mixture is prepared that comprises:
  (a) an elastic filler;
  (b) a reactive component that is a curing agent in the form of at least one polyisocyanate monomer; and
  (c) a reactive component that is resin ingredient in the form of at least one polyalcohol monomer, or polyamine monomer (or mixture of a polyamine monomer and a polyalcohol monomer), which is capable of forming a polyurea, polyurethane or copolymer of polyurethane and polyurea by reacting with the polyisocyanate monomer.

Frequently, the elastic filler comprises 5-70% ground rubber tire filler having a particle size of about 20 mesh or smaller ('smaller' as used herein to describe mesh sizes means smaller in particle size, which corresponds to a numerically larger mesh number). In some embodiments, the filler has a particle size between about 20 mesh and about 200 mesh, preferably between 20 and 100 mesh. The mixture may also comprise a second filler, which can be a hard filler, 200 mesh or smaller (i.e., having a higher mesh number). Optionally, the mixture further comprises a catalyst to promote polymer forming reaction between the polyisocyanate monomer and the polyalcohol and/or polyamine monomer.

In some embodiments, the mixture is prepared under conditions where it will polymerize rapidly, and is promptly applied to a surface to be coated. It may be applied in a thin layer, e.g., a layer less than 10 mm in thickness and preferably less than about 5 mm in thickness. The conditions are preferably controlled to provide polymerization rapidly, e.g., rapidly enough so the solid formed by polymerization remains substantially homogeneous and the particulates or fillers added to the mixture remain distributed throughout the polymeric matrix. In some embodiments, the mixture is converted into an aerosol for spraying onto a surface. Optionally, the mixture can include one or more blowing agents and/or surfactants to promote formation of a foamed product.

In other embodiments, the invention provides a solid multi-component material comprising a polymeric matrix and elastic filler produced by polymerization of the mixture described above, wherein the elastic filler comprises a recycled material such as ground rubber tire. The recycled material is typically a rubber or synthetic polymer that can be produced cheaply; reusing it keeps it out of a landfill. It is processed by careful grinding to produce small particles of moderately uniform size, typically less than 20 mesh for optimum performance in the multi-component mixtures described herein. In some of these embodiments, the polymeric matrix comprises polyurethane or polyurea (which includes a copolymer of polyurethane and polyurea), and it may contain a mixture of polyurethane and polyurea. Frequently, the polymeric matrix consists of, or consists essentially of, polyurethane, polyurea, or a mixture or copolymer of these.

In some embodiments, the solid multi-component material is produced by spraying the mixture as an aerosol onto a surface under conditions where polymerization occurs. Typically, polymerization occurs rapidly enough to provide a solid material that is substantially homogeneous and does not run or drip or sag significantly, i.e., the mixture polymerizes while the particulates and/or fillers remain suspended in it, and it polymerizes rapidly enough to produce a coating whose thickness does not change by more than about 50% after the material is sprayed onto the surface, preferably not more than about 25%.

Note that the thickness of a layer formed by spraying a multi-component reaction mixture onto a surface under conditions that promote rapid polymerization will naturally vary over the treated area, as the amount applied cannot typically be controlled exactly, so the thickness of such layers as described herein refers to an average thickness over a treated surface or area. In some embodiments, the actual thickness will be within 50% of the average thickness over at least 90% of a treated object or area. In other embodiments, the actual thickness will be within about 40% of the average thickness over at least 80% of a treated object or area. In some embodiments, more than 50% of the treated area or object will be within about 30% of the average thickness. The preceding discussion about the thickness changing refers specifically to changing thickness at a given point that would result from the material running or sagging after application and before hardening to a final thickness.

In some embodiments, a blowing agent such as water, certain halocarbons such as HFC-245fa (1,1,1,3,3-pentafluoropropane) or HFC-134a (1,1,1,2-tetrafluoroethane), or a volatile hydrocarbon such as n-pentane can be included in the multi-component material. The blowing agent can be included in the resin, or it can be admixed with the other components as an auxiliary stream when an aerosol or spray stream is formed from the resin and the curing agent or hardener. The blowing agent promotes formation of small bubbles or cells within the matrix as polymerization occurs, producing a layer with a foam texture. The degree of foaming is readily controlled by selecting a suitable blowing agent and using an appropriate amount of the blowing agent to achieve the desired foam texture. As an alternative, the mixture can be mechanically 'frothed' with air to entrain air bubbles to form a foam structure if desired.

Control of the structure of the foam, including adjusting the density and size distribution of bubbles, is readily accomplished by methods known in the art, including controlling the amount of blowing agent used. A small amount of water, for example, can be included in the resin for a polyurethane; when admixed with a suitable isocyanate curing agent, the water causes formation of $CO_2$, which forms cells within the polymerizing matrix. In addition, the use of surfactants is known to further control the texture of a foam formed in such polymeric matrices. Surfactants to modify the characteristics of the polymerization mixture are known in the art, and can be used to regulate cell size, stabilize cell structure, and slow or prevent collapse of cells during foam formation. Rigid foam surfactants are known for making very fine cells and a high 'closed' cell content. Flexible foam surfactants are designed to stabilize the reaction mass while promoting open cell formation and reducing shrinkage of the foam.

Multi-component materials disclosed herein are formed by combining reactive precursor materials or reactive components, e.g., a liquid resin ingredient or base ingredient and a liquid cure agent in desired proportions, which operate to produce the desired polymeric matrix. Resin ingredients useful in this regard include at least one polyalcohol (e.g., a diol or triol) or at least one polyamine monomer (e.g., a diamine or triamine); mixed monomers such as an aminoalcohol can also be used. Commonly used polyalcohols include ethylene glycol, propylene glycol, diethylene glycol, triethylene glycol, tetraethylene glycol, 1,3-propanediol, 1,4-butanediol, 1,5-pentanediol, or 1,6-hexanediol, as well as aromatic diols like bisphenol-A. Commonly used polyamines include ethylene diamine, 1,3-diaminopropane, 1,4-diaminobutane, 1,5-diaminopentane, 1,6-diaminohexane, polyoxypropylene amines, and aromatic amines such as phenylene diamine, isophorone diamine (IPD), and diethyltoluene diamine. The resin may also include other components such as a solvent or carrier that does not become part of the polymeric matrix, and one or more catalysts that promote reaction of the resin components with the curing agent. In some embodiments, no solvent or carrier is present. The resin typically contains a diol or diamine, which reacts with the curing agent to form a linear polymer.

The resin ingredient may also comprise a cross-linking agent. Suitable cross-linking agents may be polyalcohols that contain at least three alcohol groups per molecule, or polyamines that contain at least three amino groups per molecule, permitting linear polymers to become cross-linked with each other. Alternatively, the cross-linking agent can be a polyisocyanate having more than two isocyanate groups. The cross-linking agent commonly increases hardness and rigidity of the polymeric matrix.

Suitable curing agents comprises a diisocyanate or polyisocyanate. Commonly used curing agents include methylene diisocyanate, ethylene diisocyanate, 1,3-propanediisocyanate, 1,4-butanediisocyanate, 1,5-pentanediisocyanate, 1,6-hexanediisocyanate, hexamethylene diisocyanate (HDI), and isophorone diisocyanate (IPDI), and aromatic diisocyanates, such as methylene diphenyl diisocyanate (MDI), toluene diisocyanate (TDI), and naphthalene diisocyanate. Isocyanate groups in these curing agents form a urethane linkage with alcohol groups of the resin material to form polyurethanes, or they form urea linkages with amine groups of the resin material to form polyureas. Particular embodiments may employ a diol component such as 1,4-butanediol, 1,6-hexanediol, or a bis-phenol such as bisphenol A to form a polyurethane matrix when combined with a diisocyanate, such as HMDI, methylene diisocyanate, and the like. Methods for making and using such resin and curing agents for preparation of a polymeric matrix are well known in the art.

The multi-component materials as disclosed herein include one or more suitable fillers. The filler is typically selected to impart desired properties to the filled material, and may be used to provide a significant fraction of the material's volume. One or more fillers can be combined with a liquid component used to form the polymeric matrix; for example, a filler may be added to a liquid resin suitable for forming a polyurethane or polyurea or mixture thereof, prior to mixing the resin with a curing agent that can promote polymeric matrix formation. The combination of liquid resin and filler is referred to herein as a base component. Note that it is also possible to combine fillers, catalysts, coloring agents, and other materials with the curing agent instead of or in addition to putting them into the resin mixture.

A specific embodiment uses a fine particulate made of natural or synthetic rubber, or a blend of these, and used tires can be processed to make a particular embodiment of elastic filler that works well in the multi-component materials disclosed herein. Spent tires from automobiles, trucks, planes and the like that would typically end up in a landfill can be processed to make an elastic filler material of suitable size (ca. 20-200 mesh) that is very compatible with polymerization mixtures of polyurethane or polyurea, etc. that are suitable for spray applications. This filler has been found to integrate well with some polymerized multi-component material polymers such as polyurethane and/or polyurea. Thus in one embodiment, the multi-component materials used in the compositions, processes, systems/apparatus described herein comprises recycled tire as an elastic filler in a reactive mixture or polymeric matrix that comprises polyurethane or polyurethane precursors.

The filler materials described herein are relatively small particles, e.g., having a size that is less than half of the thickness of a layer of the multi-component material in which they are used. Typically they are under 1 mm in size, frequently under 0.8 mm, and optionally under 0.5 mm in size, although their size and shape can be irregular. 'Hard' fillers are often easier to mill to a fairly consistent size, while the elastic filler materials are often resistant to crushing and can be more difficult to prepare with a narrow size range. Accordingly, the elastic fillers used herein may be larger in size, and have a larger size range than the hard fillers.

Particle sizes are described herein using mesh sizing, which is well known in the art and is based on use of a sieve to sort particles by size. For certainty, the mesh sizes referred to herein correlate with effective particle size according to the following chart:

| Particle Size (mm) | Mesh size |
|---|---|
| 0.853 | 20 |
| 0.710 | 25 |
| 0.599 | 30 |
| 0.500 | 35 |
| 0.422 | 40 |
| 0.354 | 45 |
| 0.297 | 50 |
| 0.152 | 100 |
| 0.125 | 120 |
| 0.104 | 140 |
| 0.089 | 170 |
| 0.075 | 200 |
| 0.053 | 270 |
| 0.044 | 325 |
| 0.037 | 400 |

As the chart shows, a smaller particle has a higher numerical mesh size; thus when describing a particle by mesh size herein, a 'smaller' size means a smaller particle, which would be described by a larger mesh number. Particles defined by a mesh size refer to particles wherein at least 90% of the material by weight has the described sizing. Where an upper and lower limit are described, at least 90% of the material falls within the range of mesh sizes.

Systems and dispensing apparatus are disclosed herein for making and dispensing multi-component materials and coating compositions as disclosed herein. Such systems and dispensing apparatus are specifically engineered to overcome the above-noted limitations and deficiencies of conventional systems, apparatus and materials. As discussed in greater detail below, such systems and apparatus permits mixing and dispensing a multi-component material comprising relatively large particle sized filler, such as recycled tire material, and facilitates doing so for a large variation of isocyanate weight mix ratio "on the fly", i.e., during mixing and dispensing of the product.

Although example embodiments of the multi-component material are disclosed as being two-component multi-component material, it is appreciated and understood that different materials can be used. A two-component polyurethane material can consist of a polyurethane resin and a curing agent or hardener and may also contain a polymerization catalyst. These components are typically shipped and stored as separate materials (e.g., resin is packaged separately from curing agent) until the time of application. Then, the components are metered and mixed together at a particular proportion or mix ratio. Fillers may be present in the resin or curing agent, or may be added at the time the mixture of resin and curing agent is being prepared. Once mixed, these materials are applied by, for example, air spray, airless spray, extrusion, etc. These materials, in general, also cure (react) rapidly once mixed.

Before mixing, the resin and curing agent are in a liquid or viscous stage. Once mixed, the curing process starts, and at the end of the process the mixed and cured material is solidified. Suitable conditions and catalysts for promoting the curing process are known in the art.

In some embodiments, the polymeric matrix comprises a polyurethane, and the polyurethane is made from a diol selected from ethylene glycol, propylene glycol, diethylene glycol, triethylene glycol, tetraethylene glycol, 1,3-propanediol, 1,4-butanediol, 1,5-pentanediol, or 1,6-hexanediol; however, other suitable diols and polyols known in the art can of course also be used, such as aromatic diols like bisphenol-A; mixtures of these diols can also be used.

In some embodiments, the polyurethanes and/or polyureas are made from a diisocyanate selected from methylene diisocyanate, ethylene diisocyanate, 1,3-propanediisocyanate, 1,4-butanediisocyanate, 1,5-pentanediisocyanate, 1,6-hexanediisocyanate, hexamethylene diisocyanate (HDI), and isophorone diisocyanate (IPDI), and aromatic diisocyanates, such as methylene diphenyl diisocyanate (MDI), toluene diisocyanate (TDI), and naphthalene diisocyanate.

In some embodiments, the polymeric layer comprises a polyurea, and the polyurea is made from a diamine selected from ethylene diamine, 1,3-diaminopropane, 1,4-diaminobutane, 1,5-diaminopentane, 1,6-diaminohexane, polyoxypropylene amines, and aromatic amines such as phenylene diamine, isophorone diamine (IPD), diethyltoluene diamine, and the like.

In some embodiments, the polyureas and polyurethanes comprise a cross-linker such as a triol or polyol, or a triamine or polyamine, to provide increased strength by cross-linking monomers.

Where a blend of polyurea and polyurethane is desired, it can be made using any of the above diisocyanates, in combination with a mixture of at least one diol/polyol and at least one diamine/polyamine. The ratio of urea components to urethane components can be adjusted as desired to provide suitable rigidity, elasticity, and strength in the final product; ratios of between 5:95 and 95:5 can be used, and ratios between about 20:80 and 80:20 are sometimes used.

The diol/polyol or diamine/polyamine material (resin) used for forming these polymeric layers by spray techniques may further include initiators that catalyze efficient, rapid polymerization when the mixture is prepared. The resin or curing agent may further include UV resistance promoters, colorants, flame retardants, and the like. Suitable materials and methods for producing the requisite polymeric layers of various compositions, colors, thicknesses, and other characteristics are thus known in the art.

In some embodiments, the filled multi-component material is desirably formed as a foam, having gas/air filled bubbles or cells within the polymeric matrix. Formation of such matrices as a foam is well known in the art, and methods for controlling the density of such foamed materials are also known. To form such foamed materials, a blowing agent may be admixed with the resin or the curing agent (more commonly with the resin), or it may be introduced into the mixture of resin plus curing agent during a spray application step. Alternatively, air may be entrained into the resin, curing agent, or mixture of resin plus curing agent to promote foam formation. As discussed herein a surfactant may also be added to the material (typically in the resin) to modulate foam formation and promote consistent formation of a foam of a desired texture. Thus in some embodiments, the components used to form the filled multi-component material can further include a blowing agent, a surfactant, and/or entrained air, which can be used to promote formation of a foamed structure.

Fillers can also be added to the resin and/or curing agent. In some embodiments, only one filler material is used, and it may be a "hard" filler or an elastic filler material. In one embodiment, two main types of filler are used in the resin material: calcium carbonate at a particle distribution between 200 and 300 mesh, and ground recycled tire with a particle size distribution 20 mesh or smaller, preferably between 20 mesh and 200 mesh. The weight ratio between resin, hard filler (e.g., calcium carbonate) and elastic filler (e.g., recycled ground tire) can vary, for example, between 20% to 80%, 5% to 70% and 5% to 70%, respectively. In accordance with one embodiment, one of the components for producing the multi-component material can be about 50% resin, 25% calcium carbonate and 25% recycled ground tire, before the curing agent is added—though the exact proportions are not critical. A combination of the filler and resin can be mixed with a curing agent comprising an isocyanate and optionally a polymerization catalyst to cure the mixture. This mixture can be used to form an aerosol for spray application, for example, to form a coating on a substrate. When applied as described herein to a surface or substrate, this mixture produces a hard but flexible coating, typically between 0.5 mm and 10 mm in thickness, which has an outer surface with a higher coefficient of friction than an unfilled material made with the same polymeric matrix, partly due to surface irregularities. This filled multi-component material can provide improved friction and a surface with slight 'give', which can help control how easily items slide on or over the surface, and the cost of producing the filled material can be significantly lower than an unfilled multi-component material or even multi-component materials using different types of filler, by converting a waste product (old tires) into a new and useful durable product.

Conventional multi-component materials comprising polyurethane and/or polyurea formulations can accommodate a variation of the isocyanate weight ratio of +/−5% for the mixed reaction components, i.e., polyol and isocyanate, to cure and solidify completely. This requires the variation of the weight mix ratio of the isocyanate to be the same (+/−) 5%. Systems and apparatus used for preparing such conventional formulations are configured to provide the multi-component material having such a limited variation in the isocyanate mix ratio in a batch manner, e.g., if a different mix ratio within the +/−5% is desired, then the system and apparatus must be reconfigured to provide such different mix ratio of the produced multi-component material volume.

Having to produce separate formulations, to obtain multi-component material product having a different mix ratio, creates practical formulation limitations and deficiencies. Such limitations and deficiencies translate in practice to high costs and lost efficiencies associated with the necessity for having to produce multiple formulations, production batches and inventories. Additionally, there is an extra cost in terms of materials and possible health and environment risk associated with having to accommodate such batch formulations, which cost is in the form of having to use cleaning chemical and solvents when materials for different applications are changed.

A feature of multi-component materials, systems, methods and apparatus disclosed herein is that they have been specially engineered to enable preparation and application of multi-component materials with a multitude of diverse (cured product's) physical properties, by using a single formulation and a single dispensing system.

In an example embodiment, multi-component materials as disclosed herein can fully cure and solidify for a high percentage variation of its isocyanate. As noted above, while conventional formulations, in general, can accommodate a variation of the isocyanate ratio of +/−5%, for the mixed material to cure solidify completely, multi-component materials as disclosed herein can accommodate a variation in isocyanate weight mix ratio of up to 350%. Thus, multi-component materials as disclosed herein will fully cure for a weight mix ratio of liquid curing agent to liquid resin ingredient of between about 40:100 to 140:100. It is to be understood that such mix ratio is between the liquid reactive components and does not include the filler(s), which are neutral.

As the mix ratio of the formulation varies so do the physical characteristics of the cured multi-component material product. Typically a low mix ratio formulation will produce a cured material having properties of high elongation, and low tensile strength and hardness. A high mix ratio formulation will produce a cured material having properties of low elongation, and high tensile strength and hardness. Thus, by incrementally varying the mix ratio of the formulation, a multitude of variations of the physical characteristics of the cured product can be obtained.

In an example embodiment, a heavy filled multi-component material is provided that includes a combination of hard (solid) fillers and elastic (solid) fillers. In one example, the resin ingredient comprises approximately 50% liquid by weight, and approximately 50% solid fillers by weight. Such heavy filled multi-component material can completely cure for an isocyanate weight ratio variation of up to 350%. Thus, such heavy filled multi-component materials will fully cure for a weight mix ratio (liquid curing agent/liquid resin ingredient) of between about 20:100 to 70:100. It is to be understood that this mix ratio range is the ratio between the liquid reactive components, including the filler(s) that are neutrals.

In an example embodiment, the resulting multi-component material can comprise between about 20% to 80% polymeric matrix monomers by weight, between about 5% to 70%, hard filler by weight, and between about 5% to 70% elastic filler (e.g., recycled ground rubber) by weight. The hard filler can have a smaller particle size than the recycled ground rubber tire filler. Other components such as a catalysts to promote polymerization and any desired colorants or blowing agents can also be included, but generally represent small percentages of the material.

Multi-component material dispensing systems disclosed herein can be configured to spray a multi-component material comprising a first reactive component and a second reactive component. The first reactive component can comprise a resin and a particulate filler with a particle size distribution of about 20 mesh or smaller particle size (e.g., down to about 100 mesh, 200 mesh, or even smaller particle size), and the second reactive component can comprise a curing agent.

System Description

Figure 1:
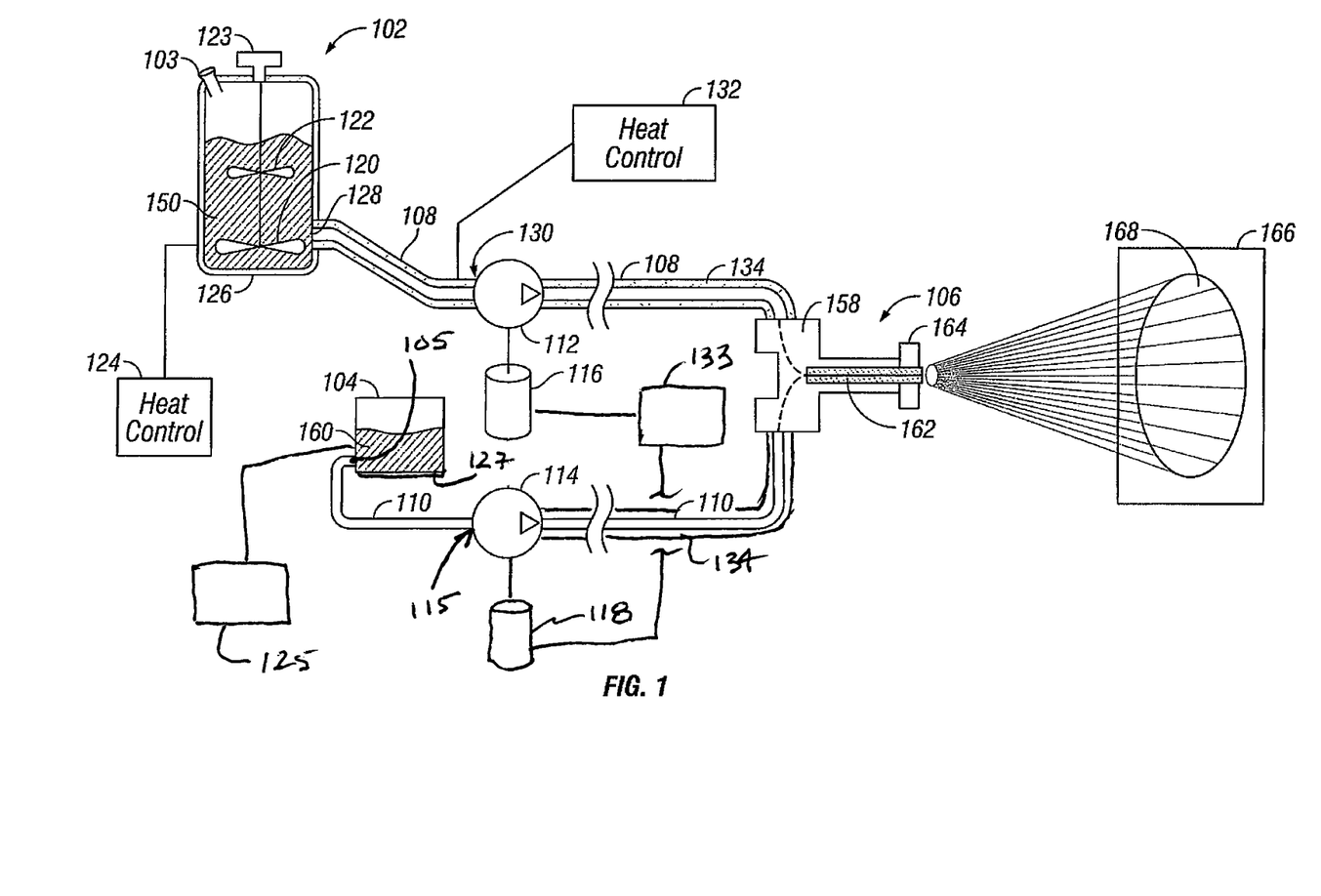
FIG. 1 is a schematic illustration of a multi-component dispensing system in accordance with an example embodiment.

FIG. 1 illustrates an exemplary system 100 for mixing and dispensing highly-filled multi-component material as disclosed herein, including a multi-component material comprising filler using recycled tire as discussed above. The system 100 comprises a plurality (here two) of liquid component reservoirs 102 and 104 for supplying the resin ingredient 150 and the curing agent component 160, respectively, to a dispensing apparatus 106 via supply lines 108 and 110. Pumping mechanisms 112 and 114 are positioned along supply lines 108 and 110 for pumping component material from respective reservoirs 102 and 104 to the dispensing apparatus 106. Pumping mechanisms 112 and 114 are separate pumps. In a preferred embodiment, each pump 112 and 114 separately driven by respective pump motors 116 and 118 that are controlled as better described below. The two pumps can be the same type of pump, or they can be different types of pumps. In some embodiments, each is selected from a gear pump and a piston pump. In certain embodiments, at least one and preferably both are gear pumps.

The reservoir 102 is configured to accommodate a desired volume of the resin ingredient 150, and can be in the form of a storage tank that includes an inlet 103 for receiving resin ingredient 150, and an outlet 128 for dispensing the resin ingredient. The reservoir 102 also includes an apparatus for mixing the materials it holds, which can be a paddle-type stirrer, a spiral mixer, a jet mixer, a rotor/stator device, or other suitable mixing device. Preferably, the apparatus for mixing is an apparatus or combination that can create a stable flow to maintain sufficient homogeneity of the resin ingredient (as the resin ingredient can include filler or other materials that may settle if not mixed), and reduce or avoid introducing air into the resin ingredient stored in the reservoir 102. In some embodiments, the mixing apparatus uses one or more impellers driven by a motor. Suitable impellers include helical ribbon impellers, anchor impellers, screw impellers, flat blade turbine impellers, disc-style impellers, as well as axial-flow or pitched-blade turbine, propeller, and hydrofoil impellers. An external motor 123 can be used to power and control the speed of the impellers. FIG. 1 depicts a stirring device having two impellers, e.g., a combination of a laminar flow impeller 120 positioned close to the bottom of the reservoir and a radial impeller 122 positioned near the center of the reservoir. Mechanisms with more or fewer impellers can also be used, as can combinations of different types of mixing apparatus.

The reservoir may include a heating means for heating and maintaining the resin ingredient at a desired elevated temperature. In a preferred embodiment, the reservoir 102 includes a heating means in the form of a heat control 124 and a heating element 126 each configured to heat the resin ingredient 150 to a predetermined temperature or temperature range, and maintain the temperature of the resin ingredient within a predetermined temperature range. In accordance with one embodiment, a desired temperature range is from about 85 to 95° F. (29.4 to 35° C.). The heating means can also comprise thermal insulation surrounding the reservoir to facilitate heating and maintaining the temperature of the resin ingredient 150 within a predetermined range. Reservoir 104 is configured to accommodate a volume of the curing agent 160. The reservoir may or may not be equipped with a heating means for heating and maintaining the temperature of the curing agent at an elevated level. In a preferred embodiment, the reservoir is heated and comprises a heat control 125 and a heating element 127 that are configured to provide the desired heating effect. In such embodiment, the heating means is controlled to provide a desired temperature range of from about 85 to 95° F. (29.4 to 35° C.). As noted for the reservoir 102, the heating means can also comprise thermal insulation surrounding the reservoir to facilitate heating and maintaining the temperature of the curing agent 160 within a predetermined range.

If desired, the system can be configured to permit one or both of the reactive components to be recirculated between the respective pumps and reservoirs. Such recirculation can take place before the reactive components are combined and mixed with one another.

Heating the resin ingredient and/or the curing agent may operate to reduce clogging and accumulation of the reactive components as they pass through the system 100. The reactive material passing through system 100 can begin reacting with the other reactive component (e.g., when combined in dispensing apparatus 106 discussed in more detail below), which can cause some of the mixture to set in the system. Over time, a cumulative effect of the material setting in the system 100 can restrict passage through the system to a point of clogging. To reduce setting, system 100 includes controls to maintain the temperature of one or all of the reactive components within a predetermined range. Thus, heat control can facilitate good mixing and avoidance of premature setting and maintain a desired consistency to ensure consistent delivery.

System 100 can gravity feed the resin ingredient 150 and/or curing agent 160 from their respective reservoirs 102 and 104 to respective pumps 112 and 114. This can be done by positioning outlet ports 128 and 105 of respective reservoirs 102 and 104 vertically higher than the respective inlets 130 and 115 of the respective pumps 112 and 114. It is understood that additional or alternative forces, apart from just gravity, may also be exerted to feed pumps 112 and 114 with the resin ingredient and/or curing agent from reservoir 102 and 104. For example, it is noted that the resin ingredient and/or curing agent can also be drawn out of the respective reservoir 102 and 104 due to a vacuum/lower pressure (here, "vacuum" being used to refer to any pressure below prevailing atmospheric pressure) created at respective the pump inlets 130 and 115 during operation of pumps 112 and 114.

Supply lines 108 and/or 110 can be configured as described above to promote smooth flow of resin ingredient and curing agent from respective reservoir outlets 128 and 105 to respective pump inlets 130 and 115. In an example embodiment, one or both of the lines 108 and 110 can also be insulated and heated. Heating means, such as a heating element and insulation 134, similar to the heating element and insulation 126 used to heat the reservoir 102, can be used to heat a portion or all of the lines 108 and/or 110, and can be controlled by one or more heat controller 132.

Heating the lines 108 and/or 110 can maintain the temperature of the resin ingredient 150 and/or curing agent 160 as it moves through system 100. Doing so can promote homogeneity of the one or both or the reactive components flowing through the system 100, including through supply line 108, and reduce the likelihood that the pumps 112 and/or 118 and/or dispensing apparatus 106 will jam due to agglomeration of the filler, particularly if the filler comprises large-sized rubber or plastic particles.

In a preferred embodiment, both the supply or feed portion of the line 108 (extending between the reservoir 102 and pump 112) and the discharge or pressure portion of the line 108 (extending between the pump 112 and the dispensing apparatus 106) of the resin ingredient is heated. In such embodiment, the supply or feed portion of the line 110 (extending from the reservoir 104 and the pump 114) is not heated, while the discharge or pressure portion of the line 110 (extending between the pump 114 and the dispensing apparatus 106) of the curing agent is heated. In certain embodiments, for example where the ambient temperature is less than about 25° C. and/or there is a risk of the curing agent freezing, it may be desired to heat the supply or feed portion of the line 110.

As noted above, a feature of the system and apparatus is that it is configured to provide a wide range of reactive component mix ratios while the product is being dispensed from the system. This can be achieved in a number of different ways. In an example embodiment, the system 100 can be configured having a dispensing apparatus 106 that includes an adjustable metering means to provide the desired variation in reactive component mix ratio, such that the desired mix ratio is provided at the dispensing apparatus 100. In another embodiment, the system 100 may be configured having separate pump motors that are operated and controlled to provide the desired mix ratio prior upstream of the dispensing apparatus 106. Accordingly, it is too be understood that the system 100 can be configured differently than as described herein to achieve the desired wide range of reactive component mix ratio.

Referring to FIG. 1, the pumping mechanisms 112 and 114 can be a gear pump head. In a preferred embodiment, the two pump heads are each driven by separate drive means 116 and 118, such as a motors. Not only can gear pumping mechanisms provide reliable metering of the components making up the multi-component material, but gear pump mechanisms can also provide a substantially uniform flow when pumping, for example, the reactive components for a polyurethane-based materials.

The gear pump heads 112 and 114 are actuated by respective independent motors 116 and 118. In an example embodiment, the motors 116 and 118 are run by a dual motor control drive 133. In such embodiment, the dual motor control drive is configured to control the speed of each motor independently, thereby operating in a "speed ratio mode." For this mode there are two main controls; namely, one control that sets the main speed, and another control that determines the ratio of the speeds between the motors. Configured in this manner, the system is capable of providing a desired multitude of reactive component mix ratios and a multitude of material flows using the same dispensing apparatus 106. The dual motor control drive 133 is configured having a user input, such as a dial or the like, that can be manually or otherwise actuated to provide user system input for obtaining the desired mix ratio and speed (e.g., output-gal/min) of the reactive components.

Alternatively, the system 100 can be configured having a single common pump drive means, and using variable gearing means (not shown) coupled to one or both drive shafts extending to respective pump heads 112 and 114, wherein such variable gearing means are configured to provide the desired wide range of reactive component mix ratios. Like the preferred embodiment discussed above, this alternative embodiment is configured to enable user input to vary the desired mix ratio during system operation, i.e., to permit "on the fly" mix ratio changes.

The illustrated system 100 further comprises a dispensing apparatus 106, here comprising a manifold 158 adapted to receive the two reactive components from respective pump mechanisms 112 and 114. The manifold 158 can receive the components (resin ingredient 150 and curing agent 160) via separate lines 108 and 110. The two components are then introduced into mixing element 162, wherein the two components are mixed before dispensing. In the illustrated embodiment, a disposable static mixing element 162 using a touch-free atomizer device can be used. While a static mixer can be used, an active mixing device can be used if desired. A mixing element and atomizer that can be used in system 100 are described in U.S. Pat. No. 6,409,098 to Lewis et al., which is incorporated herein by reference in its entirety. The atomizer disperses the liquid mixture containing filler into an aerosol and directs the aerosolized material toward a surface to be coated with the multi-component material.

It is understood, too, that other delivery or application methods can be used to apply the mixed material, in conjunction with the above system for transferring and mixing the two components, and the invention is not limited to systems or methods that require aerosol delivery.

It is appreciated that the system 100 (including the dispensing apparatus 106) can be operated in an air-drive or airless configuration. In the exemplary embodiment, dispensing apparatus 106 can also comprises a pressurized air source (not shown) which is fed into the dispenser tip cap 164 as described in detail in the aforementioned incorporated U.S. Pat. No. 6,409,098. This approach can provide minimal or no appreciable physical contact between the mixed material and the internal passageways of the dispenser apparatus. Specifically, a disposable mixing element 162 and end cap 164 can be positioned so that a distal end or tip of the disposable mixing element projects a predetermined distance from the end of the cap 164, the latter being peripheral to the former. A plurality of atomizer holes (not shown) formed in the distal end of the cap 164 in a substantially symmetrical manner dispense pressurized air or other motive gas at a high velocity, thereby acting as an eductor/atomizer for the resin/filler/curing agent mixture combined within the mixing element 162. Thus, the cap 164 does not come into contact with any of the mixed material. If the sprayed material sets, which can occur because the mixed material tends to polymerize fairly quickly, the mixing element and/or atomizer can be replaced, or a disposable mixing element and/or atomizer can be used so that these can be discarded and new ones inserted for another spraying operation, such as when moving between two parts or areas to be treated. Due to the elimination of the necessity to clean the spray nozzle after each material application, the need for cleaning solvents is further eliminated by use of replaceable or disposable spray nozzle components. This makes the subject atomizer spray apparatus, along with the other aspects of the present embodiment previously described (e.g., using recycled tire as filler), "environmentally friendly".

In an air-less embodiment of the above system, no air source is provided. Rather, the mixed material is forced out the tip of the mixing element 162 (or comparable structure) and poured or, expelled under pressure sufficient to "spray" the material in a desired pattern and density. The tip of the mixing element 164, for example, may be equipped with a diffuser (not shown) of the type well known in the art, whereby the velocity of the mixture molecules and the diffuser cooperate to deflect the trajectory of the molecules in various directions and to disperse the mixture into an aerosol or a stream. Other approaches may be used with equal success, e.g., the pressurized mixture stream may simply be dispensed as a stream without further shaping, or dispensed onto a surface and spread by a roller or brush.

Regardless of whether system 100 is an air-drive or airless configuration, system 100 can have a large diameter static mixing element to reduce the likelihood of the system clogging, in accordance with one embodiment. As explained earlier, system 100 can meter and dispense the rubber and plastic material filler having large and/or irregular geometric particle sizes. These particles can also have very high friction coefficients. These two characteristics, combined with pressure pushing a slurry solutions containing plastic, or rubber particles, through a restrictive area, like a small orifice of the dispensing apparatus, can create a an "agglomeration" effect that can clog the small orifice. This presents a potential risk that the material will clog the static mixers. To reduce the likelihood of the orifice clogging, a relatively large diameter static mixer can used in system 100, such as a static mixer having a ½ inch (1.27 cm) diameter.

Method of Application

Figure 2:
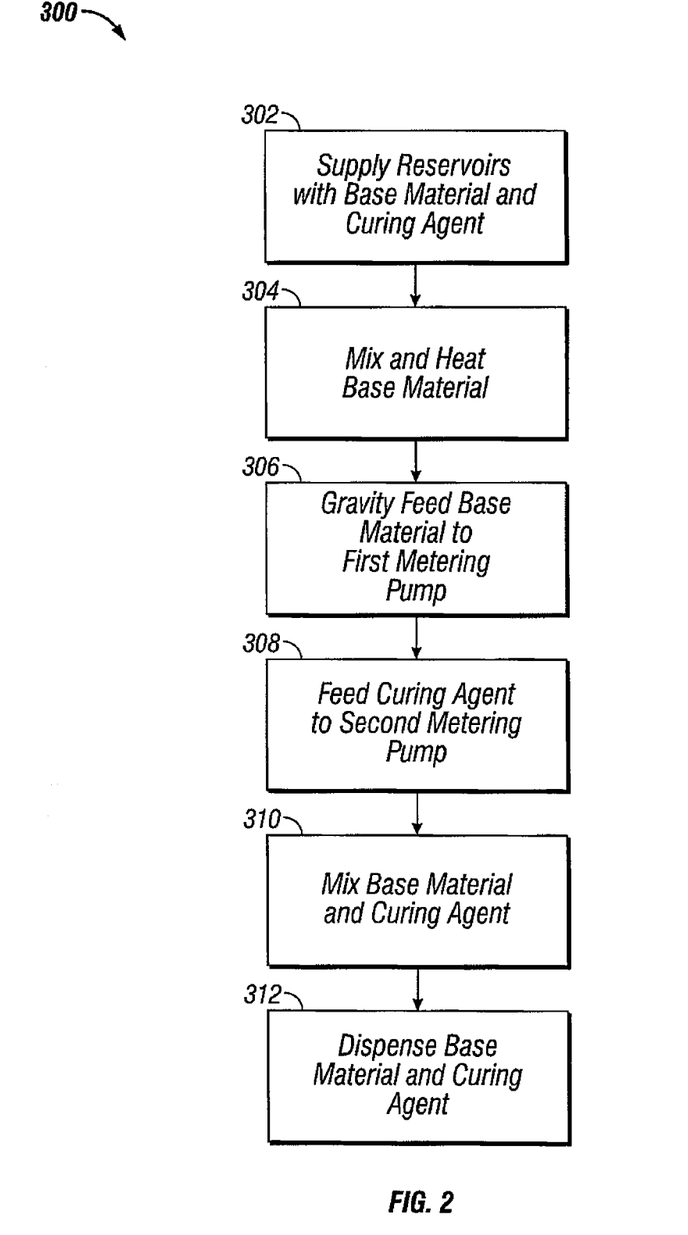
FIG. 2 is a logic flow diagram of a process for mixing, metering and dispensing a multi-component material in accordance with an example embodiment.

FIG. 2 is a flow diagram illustrating an exemplary process 300 of mixing, metering and dispensing filled multi-component material, in accordance with one embodiment. It should be appreciated that process 300 may include any number of additional or alternative tasks. The tasks shown in FIG. 2 need not be performed in the illustrated order and process 300 may be incorporated into a more comprehensive procedure or process having additional functionality not described in detail herein. For illustrative purposes, the following description of processes may refer to elements mentioned above in connection with FIG. 1.

In step 302, reservoirs 102 and 104 are filled or supplied with the respective reactive components (resin ingredient/filler or fillers, which may also referred to as the base material, and curing agent). Each reservoir 102 and 104 can be filled by pouring the component (or materials making up each component) into its respective reservoir through an opening, such as inlet 103 of the base material reservoir 102. In a variation, a reservoir, such as the curing agent reservoir 104, can comprise a bag containing the reactive component, wherein the bag includes a port connectable to the reactive component supply line. Such an arrangement is described in more detail in U.S. Patent Application Publication No. 2007/00000947 to Lewis et al., titled "Apparatus and Methods for Dispensing Fluidic or Viscous Materials," and filed on Jul. 1, 2005, the entire content of which is incorporated herein by reference. Using such an arrangement, the bag containing the reactive material can be connected to a supply line in step 302.

In step 304, the base material in reservoir 102 can be mixed and heated. As described above, the reservoir 102 can include one or more impellors for maintaining sufficient homogeneity of the base material. In addition, the reservoir 102 includes a heating element 126 and heating control 124 to heat the base material in the reservoir 102 to a predetermined temperature and maintain the temperature within a predetermined temperature range. It is appreciated that the curing agent can be similarly heated and mixed, if doing so promotes better operation or formation of the multi-component material.

In step 306, the base material 150 and curing agent 160 are fed to respective pumping mechanisms 112 and 114. As discussed above, the base material 150 can be fed to pump/pump head 112 using gravity. Gravity can similarly be used to feed curing agent 160 to pump/pump head 114, or other forces can be used to feed curing agent in addition or instead of gravity, including, for example, vacuum pressure created by operation of the pumping mechanism 114, which can draw the curing agent from reservoir 104 to the pumping mechanism 114.

The base material and curing agent are metered by pump mechanisms 112 and 114, respectively, in step 308. Here, the user selects a desired reactive component mix ratio, and the dual motor control drive 133 operates to actuate the respective pump motors 116 and 118 to drive respective pump heads 112 and 114. The Pump heads 112 and 114 hence meter the desired precise mix ratio of base material and curing agent 160, and supply the metered base material 150 and curing agent 160 to the dispensing apparatus 116 via respective supply lines 110 and 108. Additionally, the system can be configured to enable the user to select the desired material volume output (e.g., gal/min) by adjusting the motor speed (e.g., by adjusting the motor RPM—rotation per minute) after the motor(s) mix ratio is set.

In step 310, the base material 150 and curing agent 160 can be mixed using static mixing element 162 in a chamber of dispensing apparatus 106. An exemplary process of mixing the reactive components (base material and curing agent) in a mixing chamber using a static mixing element (also referred to as a "static mixing tube") is discussed in more detail in the aforementioned U.S. Pat. No. 6,409,098 to Lewis et al., incorporated herein by reference in its entirety.

At step 312, the mixed reactive components (base material 150 and curing agent 160) can be applied to surface 166. The curing agent 160 then cures the base material 150, causing the mixture to solidify into multi-component material 168 on surface 166.

In accordance with one embodiment, one or more of the steps of the process 300 can be implemented simultaneously. For example, in one variation, steps 304 to 312 are performed simultaneously.

It is appreciated that the present system is applicable to the dispensing of numerous different kinds of materials. Materials that can be sprayed in accordance with the principles of the present invention (with proper adaptation of the equipment) include, without limitation, paints, glues or adhesives, stucco, mastics, sealants, foams, undercoating, and other types of coatings, as well as other types of polymer based formulations that contain more than one component. It is especially useful for two-component materials that solidify after mixing of the two components and include particulate fillers, which are sprayed onto a surface in relatively thin layers.

Where a device or process is described herein as having a certain combination of features, it is understood that other features can be added too, as long as they do not interfere with the basic and novel features or operation of the device or process. Claims to a device or process described herein that use an open term such as 'comprising' or 'including' for a particular combination of features or steps, can alternatively "consist of" those features or steps, or "consist essentially of" those features or steps in accordance with what has been disclosed herein.

Although multi-component materials, systems method and apparatus for making the same have been disclosed herein with reference to certain embodiments and the accompanying drawings, it is to be noted that various changes and modifications will become apparent to those skilled in the art. Such changes and modifications are to be understood as being included within the scope of the present invention as defined by the appended claims.

We claim:

1. A multi-component material dispensing system configured to deliver a fully-curable multi-component material comprising a mixture of a first reactive component and a second reactive component, the first reactive component comprising a resin ingredient and an elastic filler with a particle size of about 20 mesh or smaller size, and the second reactive component comprising a curing agent, the system comprising:
    a dispensing apparatus comprising first and second inlet ports, an outlet port and a mixing chamber in fluid communication with each of the first and second inlet ports and the outlet port;
    a mixing element at least partially disposed in the mixing chamber configured to mix the first reactive component and the second reactive component, wherein the mixing element has a proximal end and a distal end, the distal end extending partially out of the outlet port of the dispensing apparatus;
    a first reservoir configured to store the first reactive component and elastic filler, the first reservoir having a heating element configured to heat the first component and filler to a predetermined temperature while the first component and filler is stored in the reservoir and a mixer configured to mix the first reactive component and filler while the first reactive component and filler is stored in the reservoir;
    a second reservoir configured to store the second reactive component;
    a first pumping mechanism adapted to pump and meter the first reactive component and filler from the first reservoir to the first port of the dispensing apparatus, wherein the first pumping mechanism and the first reservoir are physically connected by a heated transfer line;
    a second pumping mechanism adapted to pump and meter the second reactive component from the second reservoir to the second port of the dispensing apparatus; and
    means for providing a variation of curing agent weight mix ratio to resin ingredient of up to about 350% for the multi-component material dispensed from the dispensing apparatus.

2. The dispensing system as recited in claim 1 wherein the means for providing is a controller configured to provide the variation of curing agent mix ratio while the multi-component material is being dispensed by the dispensing apparatus.

3. The dispensing system as recited in claim 1, wherein the mixing element is a disposable static mixer.

4. The dispensing system as recited in claim 2, further comprising two motors that are connected to drive respective first and second pumping mechanisms, and wherein the controller regulates the speed of the two motors to provide speed ratio control while the multi-component material is being dispensed from the dispensing apparatus.

5. The dispensing system as recited in claim 1, wherein the first and second reactive components are mixed to provide a polymerization mixture having a mix weight ratio of first reactive component to second reactive component from about 40:100 to 140:100.

6. The dispensing system as recited in claim 1, wherein the multi-component material further comprises a hard filler material, and wherein the hard filler material comprises 20% to 70% by weight of the total material.

7. The dispensing system as recited in claim 6 wherein the multi-component material has a mix weight ratio of the first reactive component to the second reactive component from about 20:100 to 70:100.

8. The dispensing system as recited in claim 1, wherein the multi-component material comprises 5 to 70% of the elastic filler in the form of recycled ground rubber tire particles having a particle size of about 20 mesh or smaller.

9. The dispensing system as recited in claim 1 wherein the means for providing is an adjustable metering means to provide the variation of curing agent mix ratio while the multi-component material is being dispensed by the dispensing apparatus.

10. The dispensing system as recited in claim 9 further comprising means for controlling the operation of the first and second pumping mechanisms to provide a desired volumetric of the multi-component material delivered from the dispensing apparatus.

11. A multi-component material dispensing system configured to deliver a fully-curable multi-component material comprising a mixture of a first reactive component and a second reactive component, the first reactive component comprising a resin ingredient and an elastic filler with a particle size of about 20 mesh or smaller size, and the second reactive component comprising a curing agent, the system comprising:
    a dispensing apparatus comprising first and second inlet ports, an outlet port and a mixing chamber in fluid communication with each of the first and second inlet ports and the outlet port;
    a mixing element at least partially disposed in the mixing chamber configured to mix the first reactive component and the second reactive component, wherein the mixing element has a proximal end and a distal end, the distal end extending partially out of the outlet port of the dispensing apparatus;
    a first reservoir configured to store the first reactive component and elastic filler, the first reservoir having a heating element configured to heat the first component and filler to a predetermined temperature while the first component and filler is stored in the reservoir and a mixer configured to mix the first reactive component and filler while the first reactive component and filler is stored in the reservoir;
    a second reservoir configured to store the second reactive component;
    a first pumping mechanism adapted to pump and meter the first reactive component and filler from the first reservoir to the first port of the dispensing apparatus, wherein the first pumping mechanism and the first reservoir are physically connected by a heated transfer line;
    a second pumping mechanism adapted to pump and meter the second reactive component from the second reservoir to the second port of the dispensing apparatus; and
    a controller to regulate the output of the first and second pumping mechanisms to provide a variation of curing agent weight mix ratio to resin ingredient of up to about 350% during operation of the system while the multi-component material is being dispensed from the dispensing apparatus;

wherein the curing agent comprises a polyisocyanate monomer, and resin ingredient is selected from the group consisting of a polyalcohol monomer, a polyamine monomer and combinations thereof so that the combination of the curing agent with the resin ingredient forms a polyurea, polyurethane, or copolymer of polyurethane and polyurea.

12. The dispensing system as recited in claim 11, further comprising two motors that are connected to drive respective first and second pumping mechanisms, and wherein the controller regulates the speed of the two motors to provide speed ratio control while the multi-component material is being dispensed from the dispensing apparatus.

13. The dispensing system as recited in claim 11, wherein the first and second reactive components are mixed to provide a polymerization mixture having a mix weight ratio of first reactive component to second reactive component from about 40:100 to 140:100.

14. The dispensing system as recited in claim 11, wherein the multi-component material further comprises a hard filler material, and wherein the hard filler material comprises 20% to 70% by weight of the total material.

15. The dispensing system as recited in claim 14 wherein the multi-component material has a mix weight ratio of the first reactive component to the second reactive component from about 20:100 to 70:100.

16. The dispensing system as recited in claim 11, wherein the multi-component material comprises 5 to 70% of the elastic filler in the form of recycled ground rubber tire particles having a particle size of about 20 mesh or smaller.

17. The dispensing system as recited in claim 11 wherein the multi-component material forms a solid layer having a thickness of about 0.5 mm and 10 mm.

* * * * *